United States Patent [19]
Smith

[11] Patent Number: 6,095,284
[45] Date of Patent: Aug. 1, 2000

[54] ELEVATABLE STANDS FOR PHYSICALLY CHALLENGED HUNTERS

[76] Inventor: Elwaine Smith, 180 Elwaine La., Clayton, La. 71326

[21] Appl. No.: 09/413,459

[22] Filed: Oct. 6, 1999

[51] Int. Cl.[7] ..................................................... B66D 1/00
[52] U.S. Cl. .......................... 182/103; 187/261; 414/921; 182/148
[58] Field of Search .................. 182/103, 116, 182/148, 102, 129; 187/261; 414/921

[56] References Cited

U.S. PATENT DOCUMENTS

| 107,225 | 9/1870 | Claflin | 182/103 |
|---|---|---|---|
| 2,714,434 | 8/1955 | Peterson | 182/103 |
| 3,115,211 | 12/1963 | Ostrander | 182/103 |
| 3,176,794 | 4/1965 | Evans | 182/148 |
| 3,430,734 | 3/1969 | Embree | 182/103 |
| 3,891,062 | 6/1975 | Creneste | 182/103 |
| 4,565,262 | 1/1986 | Hawkins | 182/116 |
| 4,862,997 | 9/1989 | Eberle | 182/148 |

*Primary Examiner*—Alvin Chin-Shue
*Attorney, Agent, or Firm*—Henderson & Sturm LLP

[57] ABSTRACT

An elevatable stand construction 10 for physically challenged hunters which includes a ladder style main framework member 20 supported in an upwardly angled disposition, a chair style platform member 30 slidably disposed on the main framework member 20, and a mechanized unit 13 for moving the platform member 30 in an up and down fashion relative to the main framework member 20. The mechanized unit 13 may comprise a manual version 40 or a motorized version 50.

10 Claims, 5 Drawing Sheets

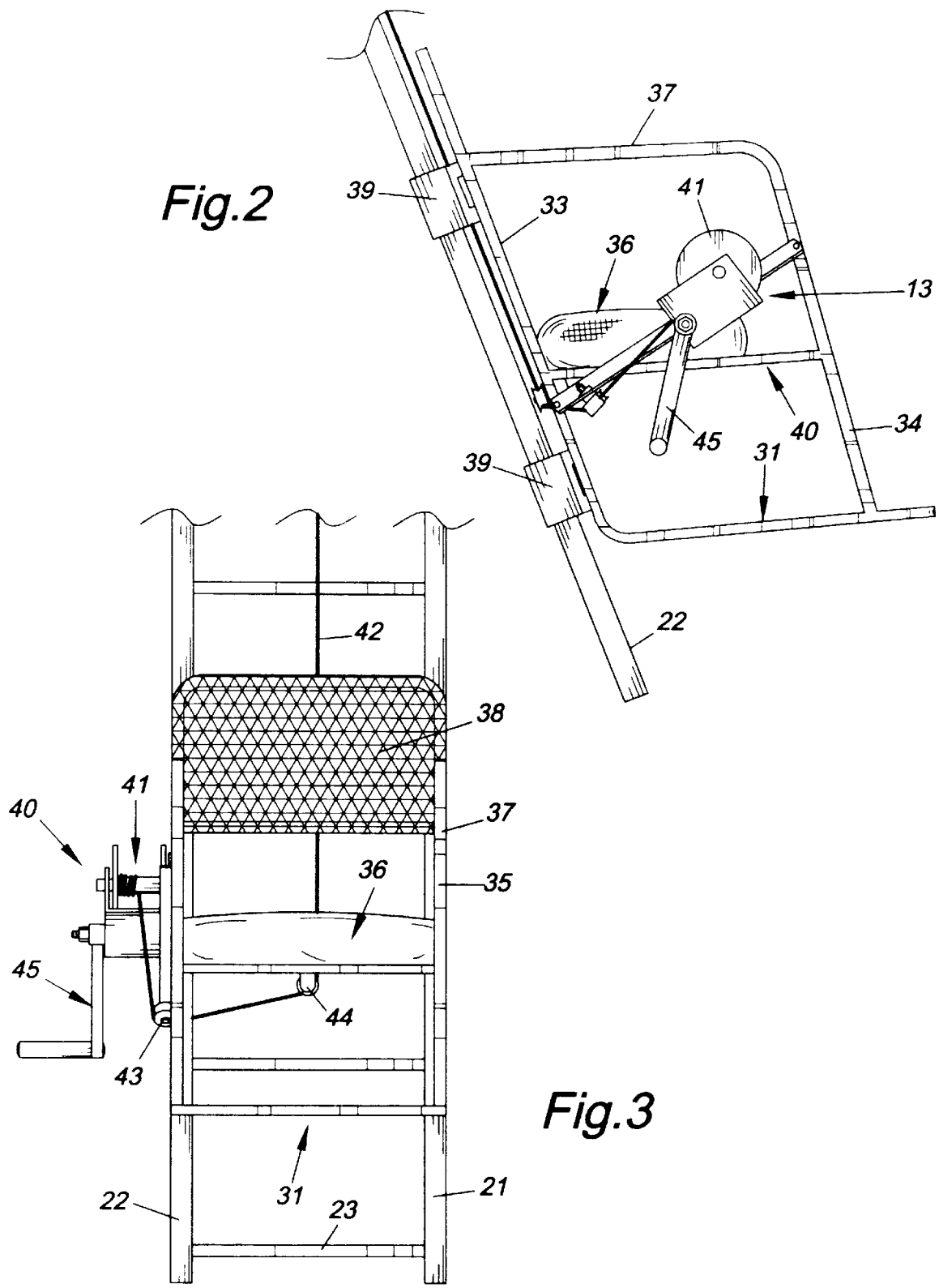

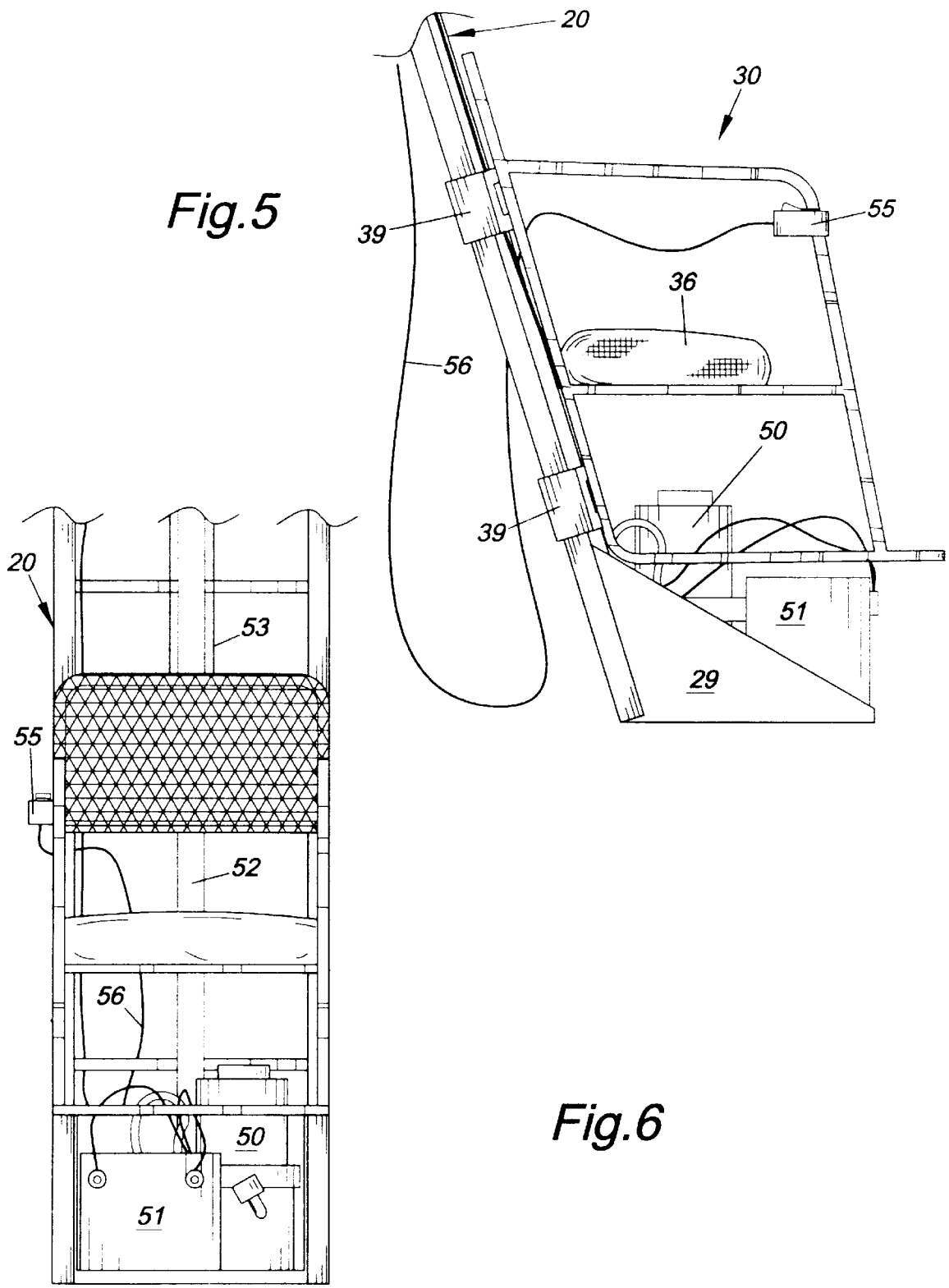

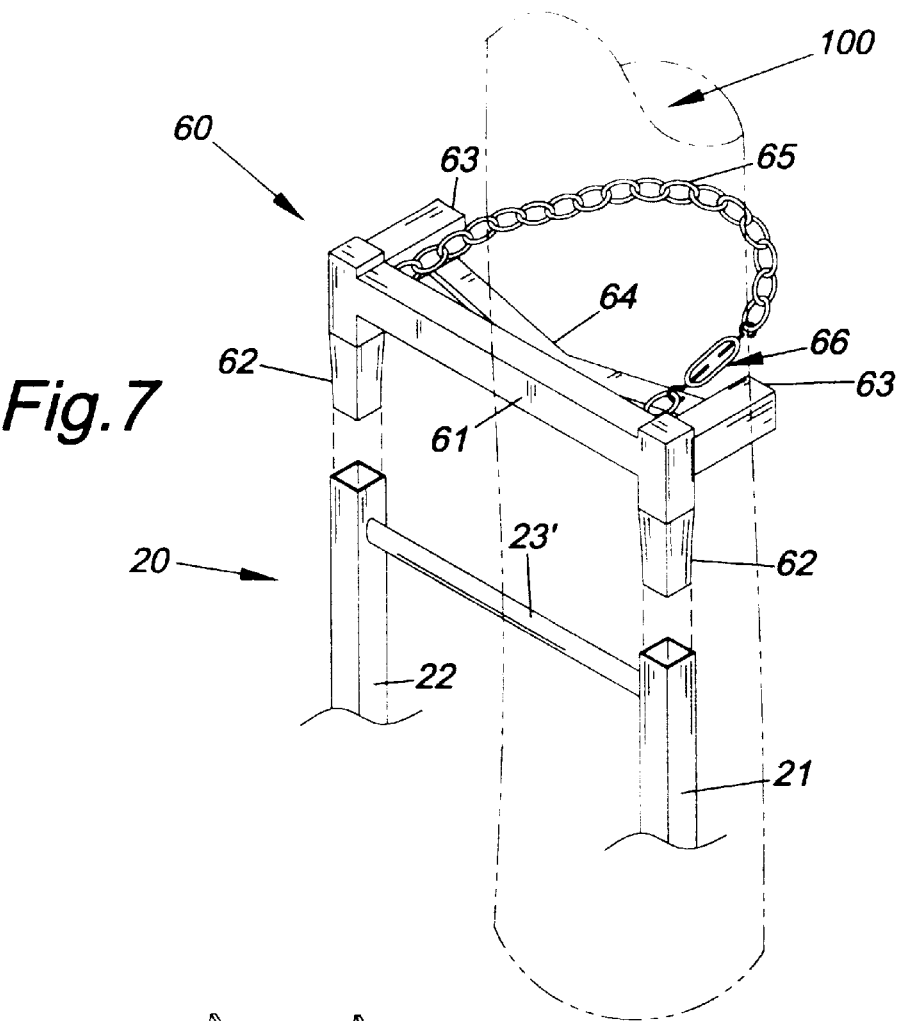
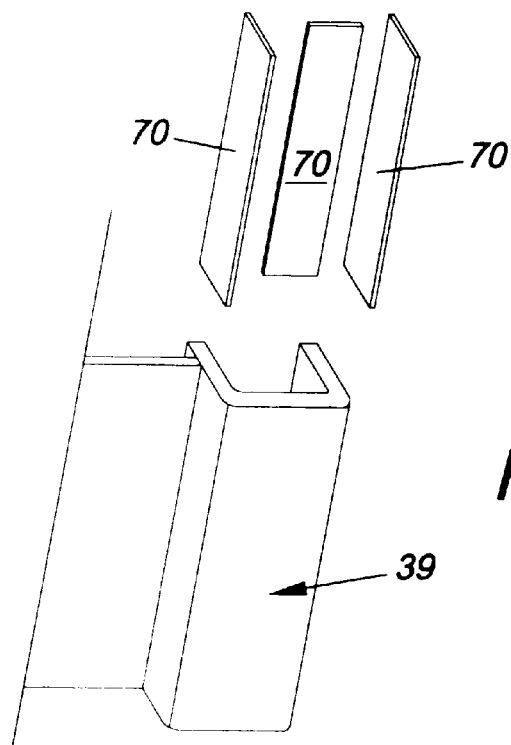

ELEVATABLE STANDS FOR PHYSICALLY CHALLENGED HUNTERS

BACKGROUND OF THE INVENTION

1. Field of the Invention

The present invention relates to the field of elevated hunting platforms in general, and in particular to a mechanized elevatable stand for use by physically challenged hunters.

2. Description of Related Art

The prior art is replete with myriad and diverse lock on type, self-climbing and permanent ladder equipped elevated hunting platform constructions.

While all of the aforementioned prior art constructions are more than adequate for the basic purpose and function for which they have been specifically designed, they are uniformly deficient with respect to their failure to provide a simple, efficient, and practical way for a physically challenged hunter to avail themselves of the advantages provided by an elevated hunting platform.

While most able bodied hunters have little or no difficulty in utilizing any of the aforementioned types of elevated hunting platforms, even the relatively minimum amount of physical exertion required to gain access to these prior art stands are far beyond the physical capabilities of virtually all physically challenged hunters.

As a result, virtually all physically challenged hunters have been relegated to pursuing game from ground level which in itself further handicaps the physically challenged hunters due to this limited field of vision on the ground, as well as the fact that their presence is more likely to be detected at ground level given the air current dispersion problems associated with human scent.

As a consequence of the foregoing situation, there has existed a longstanding need for a new and improved type of elevatable stand that can be pre-positioned by able bodied individuals for the use and enjoyment of physically challenged hunters, and the provision of such a construction is a stated objective of the present invention.

BRIEF SUMMARY OF THE INVENTION

Briefly stated, the elevatable stand construction for physically challenged hunters that forms the basis of the present invention comprises in general, a collapsible framework unit, a moveable support unit and a mechanized unit for vertically displacing the support unit relative to the collapsible framework unit.

As will be explained in greater detail further on in the specification, the framework unit 11 includes a ladder style main framework member 20 that can be attached to a tree trunk or supported by a pair of auxiliary support legs to dispose the main framework member at an angle.

In addition, the moveable support unit includes a chair style platform member attached to the ladder style framework member by a plurality of guide elements provided with low friction liners to facilitate the sliding engagement between the platform member and the main framework member.

Furthermore, the stand construction includes a mechanized unit which in one version of the invention comprises a manually operated winch member and in the other version of the invention, comprises a motorized telescoping hydraulic boom for raising and lowering the platform member relative to the main framework member.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 2 is an isolated side plan view of the support unit and the manual mechanized unit;

FIG. 3 is an isolated front plan view of the arrangement depicted in FIG. 2;

FIG. 5 is an isolated side plan view of the support unit and the motor equipped mechanized unit;

FIG. 6 is an isolated front plan view of the arrangement depicted in FIG. 5;

FIG. 7 is an isolated detail view of an adapter element used to secure a portion of the framework unit to a tree; and FIG. 8 is an exploded perspective view of the guide elements and associated low friction liners employed in the construction.

DETAILED DESCRIPTION OF THE INVENTION

Figure 1:
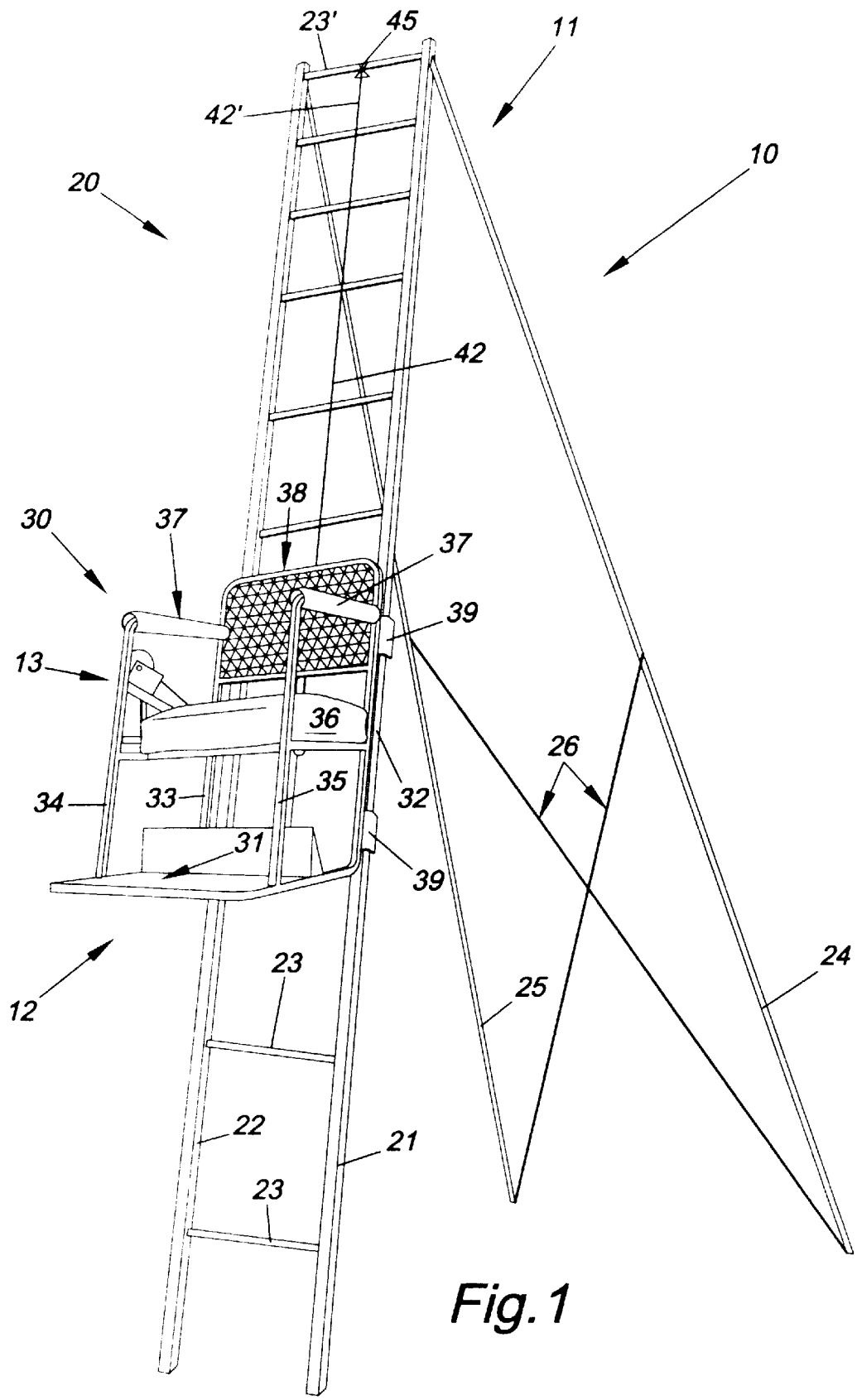
FIG. 1 is a front perspective view of the manual version of the preferred embodiment of this invention.

As can be seen by reference to the drawings, and in particular to FIG. 1, the elevatable stand construction that forms the basis of the present invention is designated generally by the reference number 10. The stand construction 10 comprises in general, a collapsible framework unit 11, a moveable support unit 12, and a mechanized unit 13. These units will now be described in seriatim fashion.

Figure 4:
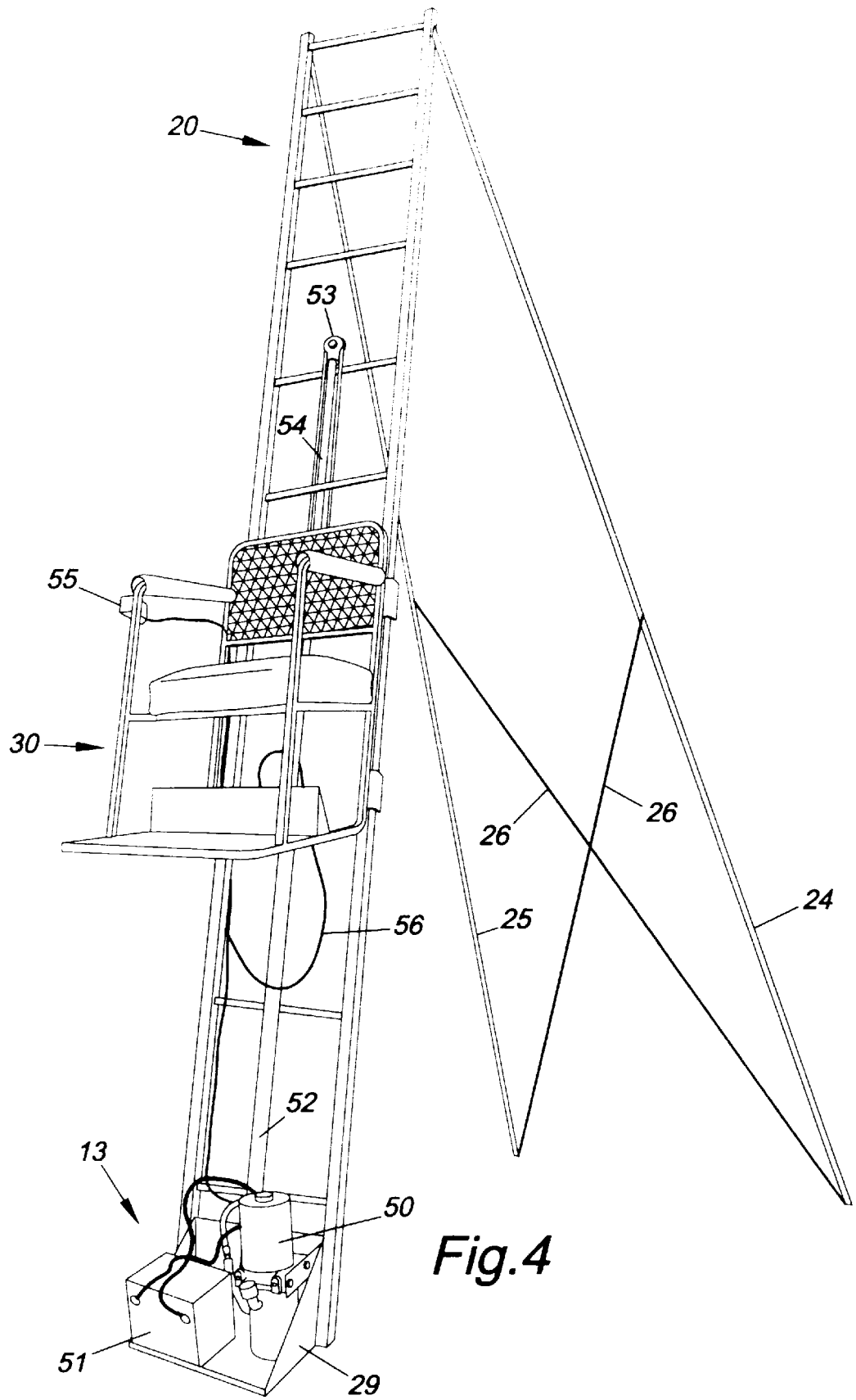
FIG. 4 is a front perspective view of the motorized version of the preferred embodiment of this invention.

As shown in FIGS. 1 and 4, the collapsible framework unit 11 comprises in general, a main ladder style main framework member 20 including two elongated vertical support legs 21, 22 rigidly connected to one another by a plurality of rung elements 23. The upper ends of each of the main support legs 21 and 22 are each provided with an auxiliary support leg 24 and 25 which are operatively connected to one another by a pair of angled cross braces 26.

In addition, the upper ends of the auxiliary support legs 24 and 25 are loosely pivotally connected to the upper ends of the main support legs 21 and 22 such that the auxiliary support legs 24, 25 can be pivoted rearwardly and outwardly relative to the primary support legs 21, 22 in a relatively wide spread four point ground engaging contact to provide stability to the framework unit.

Furthermore, each of the cross braces are pivotally connected to the lower end of one of the auxiliary support legs and releasably engageable with the intermediate portion of the other auxiliary support legs such that the auxiliary support legs 24, 25 and the cross braces 26 can be collapsed into alignment with the main support legs 21, 22 for transport and storage purposes.

In both versions of the preferred embodiments shown in FIGS. 1 and 4, the support unit 12 comprises a chair style platform member 30 which includes a horizontal platform 31 provided with four chair support legs 32, 33, 34, 35 whose intermediate portions are operatively connected to a padded seat element 36. Each of the front support legs 34, 35 are provided with arm rest elements 37 which extend from the front support legs 34, 35 to the rear support legs 33, 32.

In addition, the rear support legs 33, 32 are provided with a raised seat back 38 and each of the rear support legs 32, 33 are provided with a pair of guide elements 39 which are dimensioned to slidably receive the main support legs 21, 22 of the ladder style framework member 20, as will be explained in greater detail further on in the specification.

Turning now to FIGS. 1 through 3, it can be seen that in the manual version of the invention, the mechanized unit 13 comprises a winch member 40 mounted on one side of the moveable support unit 12. The winch member includes a ratcheted rotatable drum 41 provided with a winch cable 42 which is threaded through a pair of pulley rollers 43, 44. One of the pulley rollers 43 is offset to the side of the seat element and the other pulley roller 44 is offset to the rear of the seat element 36.

In addition, as shown in FIGS. 1 through 3, the outboard end 42' of the winch cable 42 is releasably secured to the upper ring element 23' of the ladder style framework member 20 by a securing element 45 so that by turning the winch lever arm 46, the chair style platform member 30 can be raised and lowered relative to the ladder style framework member 20.

It should also be noted at this juncture that the winch member 40 may be mounted on either side of the chair style platform member 30 to accommodate the dominant arm strength capabilities of the user.

In the motorized version of the preferred embodiment depicted in FIGS. 4 through 6, it can be seen that the bottom portion of the ladder style framework member 20 is provided with an angled outwardly projecting rigid shelf element 29 whose purpose and function will be described in greater detail further on in the specification and the chair style platform member 30 is substantially unchanged.

However, in this version of the invention, the major structural distinctions revolve around the mechanized unit 13 which employs a reversible hydraulic motor 50 powered by a battery power source 51 and operatively connected to a telescoping hydraulic boom 52 provided with a pulley roller 53 on its upper end. A length of cable 54 is threaded through the pulley roller 53 and has opposite ends which are connected to the seat back 38 of the chair style platform member 30 such that the platform member 30 can be raised and lowered relative to the ladder style support member 20 under the guidance of a control panel 55 mounted on the platform member 30 and operatively connected to the reversible hydraulic motor 50 via an electrical cable 56.

While FIGS. 1 through 6 depict the two stand alone versions of the invention, these self supported versions do have a potential drawback in that the hunter may be skylined by game animals due to a lack of concealing cover in the immediate vicinity of the stand location.

As a consequence of the foregoing situation, this invention also contemplates the provision of an adapter member 60 depicted in FIG. 7 which can be employed in conjunction with the ladder style main support member 20 to fasten the upper end of the main support member 20 to a tree trunk.

As shown in FIG. 7, the adapter member 60 includes a generally H-shaped bracket 61 having downwardly depending legs 62 which are dimensioned to be received in the hollow upper ends of the support legs 21, 22 of the ladder style framework member 20, and having rearwardly extending arms 63 that are connected to an angled brace 64 which is designed to bite into the trunk of a tree 100.

In addition, the adapter member 60 is further provided with a chain 65 and adjustable clamp 66 arrangement for securely fastening the upper end of the ladder type framework member 20 to the tree trunk.

At this juncture, it should be noted that the ladder type framework member 20 is provided primarily to allow an able bodied individual to climb up the framework unit 11 to either facilitate the erection of the stand construction or to gain access to the moveable support unit 12 if the mechanized unit 13 malfunctions while the moveable support unit 12 becomes stuck at an elevated position.

Turning now to FIGS. 1, 4, and 8, it can be seen that the ladder type framework member 20 is disposed in an angular orientation in its operative mode such that gravity assists the engagement of the guide elements 39 with the main support legs 21, 22. The interior surfaces of the guide elements 39 are provided with low friction liners 70 fabricated from TEFLON® or the like so that the support platform 30 slides easily up and down the main support legs.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. An elevatable stand construction for physically challenged hunters wherein the stand construction comprises:
   a framework unit including a ladder style main framework member having a pair of main support legs connected together by a plurality of rung elements;
   first means associated with the upper end of the main support supporting the ladder style main framework in an angled upright position;
   a movable support unit including a chair style platform member slidably connected to the main support legs, and including a platform, a plurality of support legs projecting upwardly from the platform, a padded seat element associated with the support legs, a pair of arm rests extending between said support legs and a raised seat back associated with selected ones of said support legs: wherein, the chair style platform member is oriented to face away from the ladder style main framework member; and,
   second means for moving said support unit in an up and down fashion relative to the ladder style main framework member.

2. The construction as in claim 1 wherein said second means comprises:
   a mechanized unit including a winch member attached to one side of the chair style platform member and having a rotatable drum provided with a winch cable having one end attached to a selected one of said plurality of rung elements on the ladder style main framework unit; and
   means for actuating said winch member.

3. The construction as in claim 1 wherein said second means comprises:
   a mechanized unit including a reversible hydraulic motor operatively connected to a telescoping hydraulic boom having an upper end operatively associated with a portion of the chair style platform member.

4. The construction as in claim 3 wherein the lower portion of the ladder style main framework member is provided with an angled shelf element and the hydraulic motor and the hydraulic boom are supported by the shelf element.

5. The construction as in claim 1 wherein said first means comprises:

a pair of auxiliary support legs wherein each auxiliary support leg has an upper end which is pivotally connected to the upper end of one of the main support legs.

6. The construction as in claim 5 wherein each auxiliary support leg has a lower end which is displaceable rearwardly and outwardly relative to the lower end of each of the respective main support legs.

7. The construction as in claim 6 wherein the auxiliary support legs are connected to one another by a pair of angled cross braces.

8. The construction as in claim 1 wherein said first means comprises:

an adapter member operatively associated with the upper ends of the main support legs and including a bracket provided with third means for releasably connecting the bracket to the trunk of a tree.

9. The construction as in claim 1 wherein the chair style platform member is provided with a plurality of guide elements dimensioned to slidably receive a portion of the main support legs.

10. The construction as in claim 2 wherein the chair style platform member is provided with at least one pulley roller and the cable winch is threaded through said at least one pulley roller.

* * * * *